(12) United States Patent
Wu

(10) Patent No.: US 7,142,487 B2
(45) Date of Patent: Nov. 28, 2006

(54) DEVICES AND METHODS TO IMPROVE TRACKING ERROR SIGNALS FOR OPTIC STORAGE SYSTEMS

(75) Inventor: Sheng-Hung Wu, Hsinchu (TW)

(73) Assignee: Cheertek Inc., Hsinchu (TW)

( * ) Notice: Subject to any disclaimer, the term of this patent is extended or adjusted under 35 U.S.C. 154(b) by 559 days.

(21) Appl. No.: 10/676,002

(22) Filed: Oct. 2, 2003

(65) Prior Publication Data
US 2005/0073920 A1 Apr. 7, 2005

(51) Int. Cl.
*G11B 7/00* (2006.01)
(52) U.S. Cl. .............................. 369/44.29; 369/44.27; 369/44.41
(58) Field of Classification Search .............. 369/44.27, 369/44.28, 44.29, 44.34, 44.41, 44.42
See application file for complete search history.

(56) References Cited

U.S. PATENT DOCUMENTS
5,933,397 A * 8/1999 Yamashita et al. ....... 369/44.28

* cited by examiner

*Primary Examiner*—Nabil Hindi
(74) *Attorney, Agent, or Firm*—Finnegan, Henderson, Farabow, Garrett & Dunner, L.L.P.

(57) ABSTRACT

A circuit for generating a compensation signal (TC) to compensate a tracking error (TE) swing in a servo control system, the TC signal being pre-defined in accordance with an algorithm for generating a TE signal, the circuit comprising a set of peak detection devices corresponding to a set of photo-detector elements formed in a photo-detector, each of the peak detection devices detecting an amplitude of an optical detection signal derived from a corresponding photo-detector element, a set of amplifiers of a same gain corresponding to the set of peak detection devices, the gain being selectable between an inverting and a non-inverting terminals, a set of gain selection signals corresponding to the set of amplifiers to select one of the inverting and non-inverting terminals in accordance with the pre-defined TC signal, and an adder for adding the amplitudes that are gain selected.

36 Claims, 7 Drawing Sheets

DEVICES AND METHODS TO IMPROVE TRACKING ERROR SIGNALS FOR OPTIC STORAGE SYSTEMS

FIELD OF THE INVENTION

This invention relates in general to a servo control system and, more particularly, to a circuit for tracking error compensation and a method of compensating tracking error signals in a servo control system.

BACKGROUND OF THE INVENTION

Optical recording media such as compact discs ("CDs") or digital video discs ("DVDs") are used in the art to store prerecorded information as a pattern of pits formed in a metallic substrate. The pit patterns are spirally arranged on a disc, and form digital words that can be read by radiating a laser beam on the disc surface and detecting the reflected beam. Each spiral of pits forms a track, which may not physically exist. The optical recording mediums include read-only type discs such as CD-ROM and DVD-ROM, write-once-read-many ("WROM") type discs such as CD-R (recordable) and DVD-R, DVD+R, and rewritable discs such as CD-RW and DVD RAM, DVD+RW, DVD-RW.

FIG. 1 shows a conventional optical structure 10 in the art for data reproduction. Referring to FIG. 1, structure 10 includes a disc 12, a laser diode 14, a beam splitter 16, a lens 18, and a photo-detector 20. Laser diode 14, beam splitter 16, lens 18, and photo-detector 20 together forms an optical pickup ("OPU"). Disc 12 includes at least one surface 12-2 where pits are formed. Laser diode 14 functions to serve as a laser source for radiating a laser beam 14-2. Beam splitter 16 reflects laser beam 14-2 toward lens 18, and bypasses the reflected beam from lens 18 on photo-detector 20. Lens 18 functions to serve as a scanning device to read data from disc 12, or record data on disc 12. The OPU is generally held by a sled motor (not shown), and is able to move generally perpendicularly with respect to a recording track of disc 12. The OPU may scan disc surface 12-2 along a track in a regulation mode, i.e., in a tangential direction of disc 12, or jump over a plurality of tracks in a search mode, i.e., in a radial direction of disc 12. The quality of data reproduction significantly depends on the position of lens 18. Photo-detector 20 may include photo-detector elements A, B, C and D to detect the positions of a laser spot 22 focused thereon and a pit image 24.

To control the position of lens 18, a servo control system is typically provided to provide servo error control signals that are fed back to the servo control system. The servo error control signals may include a tracking error signal (TE), a focus error signal (FE), and a center error signal (CE). The TE signal indicates the state of offset of a laser spot formed on disc surface 12-2 with respect to the center of a target track. Based on the TE signal, the servo control system exercises tracking control by controlling the converged laser beam to follow a track spiral on disk 12. The FE signal indicates the state of focus offset of OPU 18 with respect to disc surface 12-2. For example, the laser spot reflected back to photo-detector 20 generally has a circular form if lens 18 is in focus, and may have an elliptical form if lens 18 is out of focus. The CE signal indicates the state of offset of laser spot 22 formed on photo-detector 20 with respect to a central line 26 between photo-detector elements A, D and photo-detector elements B, C.

A technique in the art for generating a TE signal utilizes differential phase detection ("DPD"). FIG. 2 is a schematic view of a conventional circuit structure 30 according to DPD. Referring to FIG. 2, DPD structure 30 includes a photo-detector 32 having photo-detector elements A, B, C and D, amplifier pairs 34, equalizers 36, comparator pairs 38, a phase comparator 40, low pass filters 42 and a differential amplifier 44. However, mismatched amplifier gains between amplifier pairs 34 or mismatched hysteresis levels between comparator pairs 38 may cause different time lags. The difference between time lags may result in a TE signal distortion or cause a TE signal to swing, where the servo control performance deteriorates because of non-uniform zero-cross points when the swing TE signal is fixed-level sliced and sampled. A swinging TE signal includes a direct current (dc) component having a frequency, for example, smaller than one tenth of that of its alternating current (ac) component. The TE signal, designed to be fed back to the servo control system for better control in positioning the optical pickup, inherently includes an offset, i.e., the dc component.

It is thus desirable to provide circuits and methods to overcome at least the aforementioned shortcomings in the art and, more particularly, eliminate the offset to improve the TE signal. It is also desirable that the circuits and methods are applicable to other techniques in the art for generating TE signals, and to discs where tracks are recorded, unrecorded, or under recording, regardless of the state of the system being in a regulation mode or a search mode.

SUMMARY OF THE INVENTION

Accordingly, the present invention is directed to a circuit and a method that obviate one or more of the problems due to limitations and disadvantages of the related art.

To achieve these and other advantages, and in accordance with the purpose of the invention as embodied and broadly described, there is provided a circuit for generating a compensation signal (TC) to compensate a tracking error (TE) swing in a servo control system, the TC signal being pre-defined in accordance with an algorithm for generating a TE signal, the circuit comprising a set of peak detection devices corresponding to a set of photo-detector elements formed in a photo-detector, each of the peak detection devices detecting an amplitude of an optical detection signal derived from a corresponding photo-detector element, a set of amplifiers of a same gain corresponding to the set of peak detection devices, the gain being selectable between an inverting and a non-inverting terminals, a set of gain selection signals corresponding to the set of amplifiers to select one of the inverting and non-inverting terminals in accordance with the pre-defined TC signal, and an adder for adding the amplitudes that are gain selected.

In one aspect, the gain is determined by dividing a peak amplitude of a swing signal representing the TE swing with a peak amplitude of the pre-defined TC signal.

In another aspect, the amplifiers further comprise a set of unitary amplifiers of a gain selectable between 1 and −1, each of the unitary amplifiers being coupled between a corresponding peak detection device and the adder; and an amplifier of the same gain as each of the set of amplifiers coupled to the adder.

Also in accordance with the present invention, there is provided a servo control system that comprises a photo-detector to detect a position of a laser spot, a set of photo-detector elements formed in the photo-detector to provide optical detection signals regarding the position of the laser spot, an amplifier circuit to generate a tracking error (TE) signal in accordance with an algorithm, and a circuit for generating a compensation signal (TC) to compensate a swing of the TE signal, the circuit further comprising a set of peak detection devices corresponding to the set of photo-detector elements, each of the peak detection devices detecting a peak amplitude of an optical detection signal derived from a corresponding photo-detector element, a set of amplifiers of a same gain corresponding to the set of peak detection devices, the gain being selectable between an inverting and a non-inverting terminals, a set of gain selection signals corresponding to the set of amplifiers to select one of the inverting and non-inverting terminals, and an adder for adding the amplitudes that are gain selected.

In one aspect, the TC signal is pre-defined in accordance with the algorithm.

In another aspect, the pre-defined TC signal further comprises a linear combination of peak (X) representing an envelope peak amplitude value of an optical detection signal derived from a photo-detector element X of a photo-detector of the servo control system.

Still in accordance with the present invention, there is provided a servo control system that comprises a photo-detector to detect a position of a laser spot, a set of photo-detector elements formed in the photo-detector to provide optical detection signals regarding the position of the laser spot, a tracking error (TE) signal generated in accordance with an algorithm, a compensation signal (TC) associated with the algorithm to compensate a TE signal swing further comprising a linear combination of peak (X) representing an envelope peak amplitude value of an optical detection signal derived from one of the photo-detector elements X of the photo-detector, and a swing signal associated with the algorithm to represent the TE signal swing, wherein a peak amplitude of the swing signal and a peak amplitude of the TC signal are measured in compensating the TE signal swing.

In one aspect, the algorithm further comprises differential phase detection, push-pull and 3-beam.

Yet still in accordance with the present invention, there is provided a servo control system that comprises a first circuit to generate a tracking error (TE) signal in accordance with an algorithm, a TE swing produced in generating the TE signal in accordance with the algorithm, a swing signal associated with the algorithm generated to represent the TE swing, and a second circuit to generate a compensation signal (TC) to compensate the TE swing, the TC signal being K times in amplitude and reverse in polarity with respect to the TE swing, K being a coefficient, wherein the coefficient K is determined by dividing a peak amplitude of the swing signal with a peak amplitude of the TC signal.

Still in accordance with the present invention, there is provided a method of compensating a tracking error (TE) swing in a servo control system that comprises determining an algorithm for generating a TE signal, generating a swing signal associated with the algorithm that represents the TE swing, generating a compensation signal (TC) associated with the algorithm, measuring an amplitude of the swing signal as $V_{TE}$, measuring an amplitude of the TC signal as $V_{TC}$, and determining a gain by dividing $V_{TE}$ with $V_{TC}$.

Still in accordance with the present invention, there is provided a method of compensating a tracking error (TE) swing in a servo control system that comprises providing an algorithm, providing a first circuit to generate a tracking error (TE) signal in accordance with the algorithm, generating a swing signal associated with the algorithm to represent a TE swing produced in generating the TE signal, providing a second circuit to generate a compensation signal (TC) to compensate the TE swing, the TC signal being K times in amplitude with respect to the TE swing, K being a coefficient, and determining the coefficient K by dividing a peak amplitude of the swing signal with a peak amplitude of the TC signal.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1:
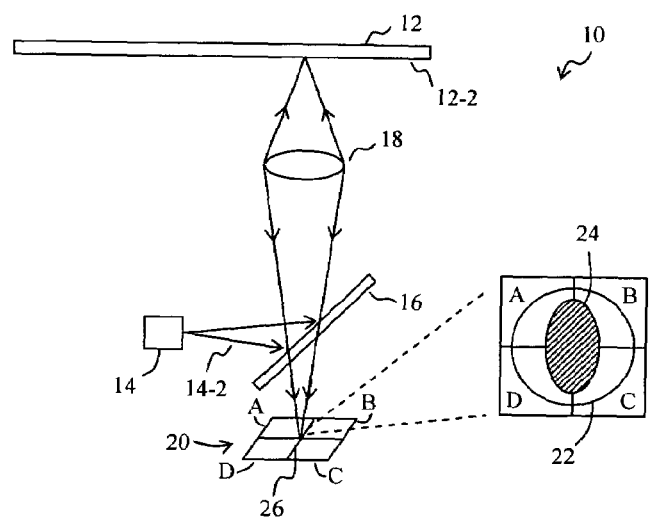
FIG. 1 is a schematic view of a conventional optical structure for data reproduction.
Figure 2:
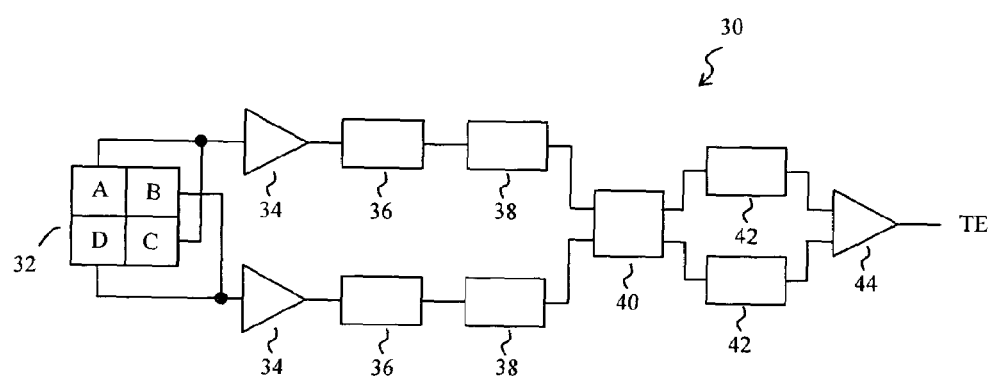
FIG. 2 is a schematic view of a conventional circuit structure according to differential phase detection (DPD)
Figure 3A:
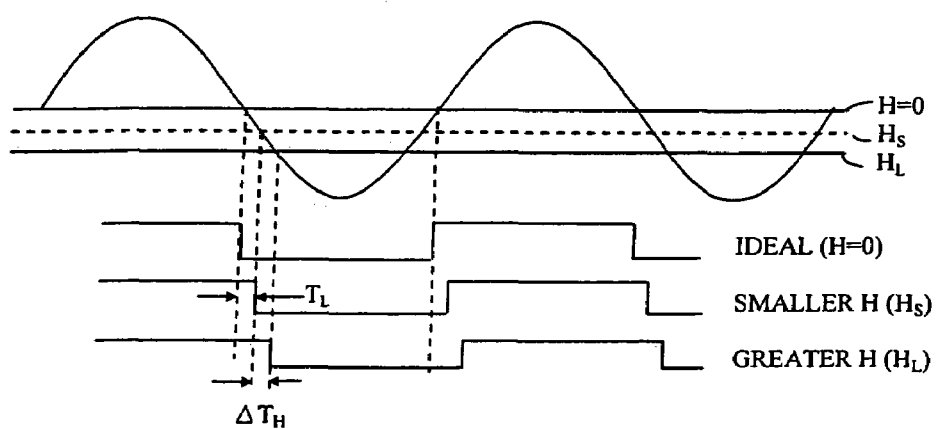
FIGS. 3A and 3B are diagrams illustrating time lags caused by different hysteresis levels and different amplifier gains, respectively.
Figure 3B:
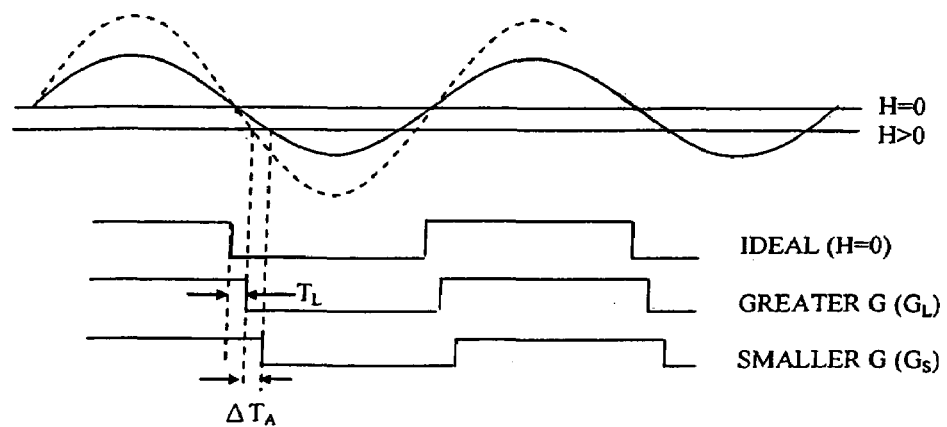

In a circuit structure based on differential phase detection ("DPD"), optical detection signals derived from photo-detector elements A, B, C and D are used to generate a TE signal through comparator pairs and amplifier pairs. FIGS. 3A and 3B are diagrams illustrating time lags caused by different hysteresis levels between comparator pairs and different amplifier gains between amplifier pairs, respectively. FIG. 3A shows a DPD phase function of an optical detection signal derived from photo-detector elements A, B, C or D. Referring to FIG. 3A, the optical detection signal includes, for example, a sinusoidal waveform. Ideally, the optical detection signal oscillates with respect to a line free from hysteresis (H=0), resulting in an ideal digital output when the optical detection signal is sampled. In practice, however, each comparator used in the circuit may have a pair of hysteresis levels different from those of others. FIG. 3A shows that the greater the hysteresis level a comparator has, the greater the time lag $T_L$ the comparator causes. The time lag difference, delta $T_H$, between two comparators of different hysteresis levels, $H_S$ and $H_L$, may be linearly modeled as follows.

$$\Delta T_H = K_1 \times \Delta H$$

where $K_1$ is a coefficient greater than 0 and $\Delta H$ is the hysteresis level difference between two comparators.

FIG. 3B shows the phase functions of two optical detection signals derived from photo-detector elements A, B, C or D. It is presumed that the two optical detection signals have a same hysteresis level and different amplifier gains. FIG. 3B shows that the greater the amplifier gain an amplifier has, the smaller the time lag $T_L$ the amplifier causes. The time lag difference, delta $T_A$, between two amplifiers of different amplifier gains, $G_S$ and $G_L$, may be linearly modeled as follows.

$$\Delta T_A = -K_2 \times \Delta V$$

where $K_2$ is a coefficient greater than zero, and $\Delta V$ is the amplitude difference between two optical detection signals amplified by the amplifier pairs.

The total time lag difference $\Delta T$ is therefore modeled as follows.

$$\Delta T = \Delta T_H + \Delta T_A = K_1 \times \Delta H - K_2 \times \Delta V$$

The total time lag difference $\Delta T$ caused by mismatched amplitude gains among photo-detector elements A, B, C and D may result in a DPD TE signal swing. According to the present invention, a tracking error compensation (TC) signal is provided to cancel a TE swing. The TC signal, including an offset component that is reverse in polarity and K times in magnitude with respect to a TE swing, K being a coefficient, is added to the TE signal before being supplied to a servo control system. In one embodiment, a circuit for generating a TC signal is independent of that for generating a TE signal. The definition of the TC signal and the value of the coefficient K depend on the methods, i.e., the DPD, push-pull, 3-beam methods and the combination thereof, for generating a TE signal. Algorithms of the DPD, push-pull and 3-beam methods are discussed below.

(a) A first DPD algorithm: phase (A+C)−phase (B+D)

A circuit built in accordance with the first DPD algorithm for generating a TE signal makes use of the optical detection signals from photo-detector elements A, B, C and D to perform calculation processing given by phase (A+C)−phase (B+D)

Under this DPD algorithm, the gain factor $\Delta V$ is considered. Since the photo-detector elements A, C and B, D are respectively diagonally arranged in a photo-detector, the result of phase (A+C)−phase (B+D) includes the information regarding the non-circular level of a laser spot, which is the function of a focus error (FE) signal. A TE signal generated by the DPD algorithm may be $\Delta V$ sensitive to focus spot distortion caused by, for example, disc tilts or focus run-outs. To compensate a TE signal swing due to the $\Delta V$ factor, in one embodiment according to the present invention, the TC signal is defined as follows.

$TC$=peak ($A$)+peak ($C$)−peak ($B$)−peak ($D$)

where peak (X) represents an envelope peak amplitude value of an optical detection signal derived from a photo-detector element X of a photo-detector.

In another embodiment, TC is defined as peak (A+C)−peak (B+D).

A method in accordance with one embodiment of the present invention to determine the coefficient K associated with the above defined TC signals includes the following steps.

(a1) activating a focus servo of a servo control system by, for example, biasing an input FE signal with a continual waveform such as a sinusoidal or a triangular waveform, to generate a swing signal;

(a2) measuring an amplitude of the defined TC signal as $V_{TC}$;

(a3) measuring a center shift amplitude of the swing signal as $V_{TE}$; and (a4) dividing the amplitude $V_{TE}$ with the amplitude $V_{TC}$, i.e., $V_{TE}/V_{TC}$.

In operation, if $V_{TE}$ and $V_{TC}$ are in phase, K is equal to $-V_{TE}/V_{TC}$, and if $V_{TE}$ and $V_{TC}$ are out of phase, K is equal to $V_{TE}/V_{TC}$. The TC signal is then multiplied by K, and added to a TE signal path to cancel the TE signal swing. The TC signal is used to compensate the TE signal swing not only in the regulation mode but also in the search mode. For example, in the search mode if a speed error sampling is conducted at the zero-cross points of a TE signal, the TC signal may be used to compensate for the swing of the TE signal.

(b) A second DPD algorithm: phase (A)−phase (B)+phase (D)−phase (C)

A circuit built in accordance with the DPD algorithm for generating a TE signal makes use of the optical detection signals from the photo-detector elements A, B, C and D to perform calculation processing given by phase (A)+phase (B)−phase (D)−phase (C)

Under this DPD algorithm, both the hysteresis factor $\Delta H$ and the gain factor $\Delta V$ must be considered. Specifically, if a laser spot center shifts in the tangential direction of a track, a center level of the DPD TE signal also shifts. When the center of the laser spot shifts, for example, upward the A+B half along a track, the amplitudes of the optical detection signals derived from photo-detector elements A and B may become greater, and those of photo-detector elements C and D become smaller. The TE signal generated by the algorithm may be sensitive to a laser spot tangential shift. A TC signal for this DPD algorithm is defined as follows.

$TC$=peak ($A$)+peak ($B$)−peak ($C$)−peak ($D$)

In other embodiments, the TC signal is defined as one of the following forms.

$TC$=peak ($C$)+peak ($D$)−peak ($A$)−peak ($B$);

$TC$=peak ($A+B$)−peak ($C+D$); or $TC$=peak ($C+D$)−peak ($A+B$).

A method in accordance with one embodiment of the present invention to determine the coefficient K associated with the above defined TC signals includes the following steps.

(b1) tilting a disc during rotation to generate a swing signal;

(b2) measuring an amplitude of the TC signal as $V_{TC}$;

(b3) measuring a center shift amplitude of the swing signal as $V_{TE}$; and (b4) dividing the amplitude $V_{TE}$ with the amplitude $V_{TC}$, i.e., $V_{TE}/V_{TC}$.

In operation, if $V_{TE}$ and $V_{TC}$ are in phase, K is equal to $-V_{TE}/V_{TC}$, and if $V_{TE}$ and $V_{TC}$ are out of phase, K is equal to $V_{TE}/V_{TC}$. The TC signal is then multiplied by K, and added to a TE signal path to cancel the TE signal swing. The TC signal is used to compensate the TE signal in both the regulation mode and the search mode.

Figure 4:
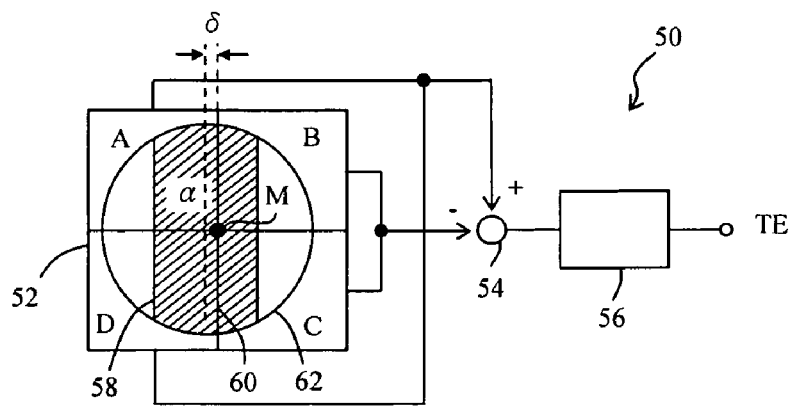
FIG. 4 is a schematic diagram of a push-pull circuit structure illustrating a laser spot shift.

(c) Push-pull method for pressed discs:

FIG. 4 is a schematic diagram illustrating a laser spot shift in a push-pull circuit structure 50. Referring to FIG. 4, push-pull circuit structure 50 includes a photo-detector 52 including photo-detector elements A, B, C and D, an adder 54, and a low pass filter 56. The linear models established for the DPD methods are not applicable to the push-pull or 3-beam method. However, the peak detection approach according to the present invention used for the DPD methods is still applicable to the push-pull and 3-beam methods, as discussed further below.

Push-pull circuit structure 50 for generating a TE signal makes use of the optical detection signals from the photo-detector elements A, B, C and D to perform calculation processing given by $$(A+D)-(B+C)$$

The low-passed push-pull TE signal indicates a track shift between both the (A+D) and (B+C) halves of photo-detector 52. Assuming that the magnitude of shift of a track 58 from a center line 60 is δ, the ratio of an average laser power density between a track area and a non-track area is α (α<1), and the total area of a laser spot 62 is pi, the TE shift is approximately 4*δ*(1−α), which may be deemed K×δ. For a general disc, α generally includes a fixed value, and δ includes a varying value. By measuring the track shift δ, the TE shift is able to be compensated.

A TC signal used for the push-pull method is defined as follows.

$$TC = \text{peak}(A) + \text{peak}(D) - \text{peak}(B) - \text{peak}(C)$$

In another embodiment according to the present invention, TC=peak (A+D)−peak (B+C).

A method in accordance with one embodiment of the present invention to determine the coefficient K associated with the above defined TC signal includes the following steps.

(c1) activating a focus servo of a servo control system;

(c2) applying to a tracking coil a force in, for example, a sinusoidal or triangular waveform, during rotation of a disc to generate a swing signal representing a TE swing;

(c3) measuring an amplitude of the TC signal as $V_{TC}$;

(c4) measuring a center shift amplitude of the swing signal as $V_{TE}$; and (c5) determining K by dividing the amplitude $V_{TE}$ with the amplitude $V_{TC}$, i.e., $V_{TE}/V_{TC}$.

In operation, if $V_{TE}$ and $V_{TC}$ are in phase, K is equal to $-V_{TE}/V_{TC}$, and if $V_{TE}$ and $V_{TC}$ are out of phase, K is equal to $V_{TE}/V_{TC}$. The TC signal is then multiplied by K, and added to a TE signal path to cancel the TE signal swing. The TC signal may be used in both the regulation mode and the search mode to compensate the TE signal swing.

(d) Push-pull method for discs including recorded write-once or rewritable tracks:

It may be difficult to detect a laser spot shift for discs including recorded write-once or rewritable tracks by establishing a relationship between the laser spot shift and a track position because the reflection rate of a recordable area is different from that of a non-recordable area. Nevertheless, the difference in amplitude between signals sent from the photo-detector elements A, D and B, C can be detected and used to keep a laser spot on a track center.

A TC signal for the above-mentioned push-pull method is defined as follows.

$$TC = \text{peak}(A) + \text{peak}(D) - \text{peak}(B) - \text{peak}(C)$$

A method in accordance with one embodiment of the present invention to determine the coefficient K associated with the above defined TC signal includes the following steps.

(d1) activating a focus servo and a spindle motor of a servo control system;

(d2) applying a force to a tracking coil during rotation of a disc to generate a swing signal representing a TE swing;

(d3) measuring an amplitude of the TC signal as $V_{TC}$;

(d4) measuring a center shift amplitude of the swing signal as $V_{TE}$; and (d5) determining the coefficient K by dividing the amplitude $V_{TE}$ with the amplitude $V_{TC}$, i.e., $V_{TE}/V_{TC}$.

In operation, if $V_{TE}$ and $V_{TC}$ are in phase, K is equal to $-V_{TE}/V_{TC}$, and if $V_{TE}$ and $V_{TC}$ are out of phase, K is equal to $V_{TE}/V_{TC}$. The TC signal is then multiplied by K, and added to a TE signal path to cancel the TE signal swing. The TC signal may be used in both the regulation mode and the search mode to compensate the TE swing.

(e) 3-beam method for pressed discs:

In the 3-beam method, mechanical or electrical mismatches may cause a track center to deviate from zero-cross points of a TE signal. In addition to optical detection signals of photo-detector elements A, B, C and D that contribute to a main beam, other optical detection signals of photo-detector elements E and F or E, F, G and H that contribute to two side beams are utilized. A 3-beam TE signal indicates reflections from adjacent tracks. A TC signal for the 3-beam method is defined as follows.

$$TC = \text{peak}(A) + \text{peak}(D) - \text{peak}(B) - \text{peak}(C)$$

A method in accordance with one embodiment of the present invention to determine the coefficient K associated with the above defined TC signal includes the following steps.

(e1) activating a focus servo and a spindle motor of a servo control system;

(e2) applying a force to a tracking coil during rotation of a disc to generate a swing signal representing a TE swing;

(e3) measuring an amplitude of the TC signal as $V_{TC}$;

(e4) measuring a center shift amplitude of the swing signal as $V_{TE}$; and (e5) determining the coefficient K by dividing the amplitude $V_{TE}$ with the amplitude $V_{TC}$, i.e., $V_{TE}/V_{TC}$.

In operation, if $V_{TE}$ and $V_{TC}$ are in phase, K is equal to $-V_{TE}/V_{TC}$, and if $V_{TE}$ and $V_{TC}$ are out of phase, K is equal to $V_{TE}/V_{TC}$. The TC signal is then multiplied by K, and added to a TE signal path to cancel the TE signal swing. The TC signal may be used in both the regulation mode and the search mode to compensate the TE signal swing.

In addition to the above-mentioned DPD, push-pull and 3-beam methods, the peak detection approach according to the present invention is also applicable to discs during recording.

(f) Discs including unrecorded write-once or rewritable tracks:

Since no information is recorded, the value of K may be set to zero, and a TC signal may be the same as that defined for the push-pull methods.

Figure 5:
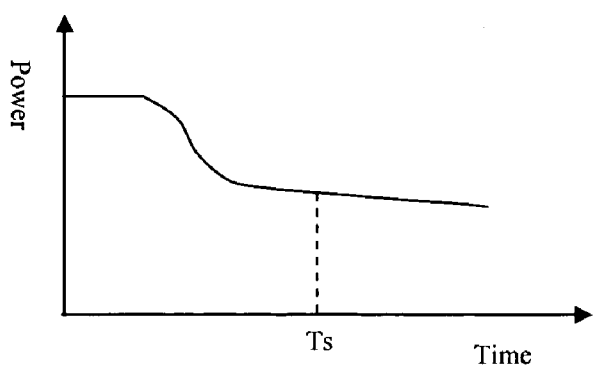
FIG. 5 is a schematic diagram illustrating the relationship between reflection power and recording time.

(g) Discs including tracks under recording:

When a laser beam scans a track, a recorded area formed with pits generally does not reflect the laser beam, and a non-recorded area either designed to be a blank area or not yet formed with pits reflects most of the laser beam. FIG. 5 is a schematic diagram illustrating the relationship between the power of a reflected laser beam and recording time. Referring to FIG. 5, the reflected power is kept at a higher level because few pits are formed. As time proceeds and an increasing number of pits are formed, the reflected power declines to a lower level.

Assuming that the reflected power is between 0 (at recorded areas) and 1 (at non-recorded areas), the position of a track is revealed by a reflected power of the track. In one embodiment according to the invention, the reflected powers of a track detected by photo-detector elements A, B, C and D are sampled at a time $T_S$. The difference in reflected power between the photo-detector elements A, D and the photo-detector elements B, C, for example, by measuring the maximum voltage drop of the photo-detector elements A, D and B, C, is proportional to the track position. The TC signal therefore is defined as follows.

$TC = \text{peak } (A_{TS}+D_{TS}) - \text{peak } (B_{TS}+C_{TS})$, or peak $(A_{TS})$+ peak $(D_{TS})$-peak $(B_{TS})$-peak $(C_{TS})$ Wherein peak $(X_{TS})$ represents an envelope peak amplitude value measured at the time $T_S$ of an optical detection signal derived from a photo-detector element X of a photo-detector.

A method in accordance with one embodiment of the present invention to determine the coefficient K associated with the above defined TC signal includes the following steps.

(g1) activating a servo control system in a recording mode;

(g2) generating a swing signal that represents a TE swing;

(g3) measuring an amplitude of the TC signal as $V_{TC}$;

(g4) measuring a center shift amplitude of the signal that represents a TE swing as $V_{TE}$; and (g5) determining the coefficient K by dividing the amplitude $V_{TE}$ with the amplitude $V_{TC}$, i.e., $V_{TE}/V_{TC}$.

In operation, if $V_{TE}$ and $V_{TC}$ are in phase, K is equal to $-V_{TE}/V_{TC}$, and if $V_{TE}$ and $V_{TC}$ are out of phase, K is equal to $V_{TE}/V_{TC}$. The TC signal is then multiplied by K, and added to a TE signal path to cancel the TE signal swing. The TC signal may be used in both the regulation mode and the search mode to compensate the TE swing.

Figure 6:
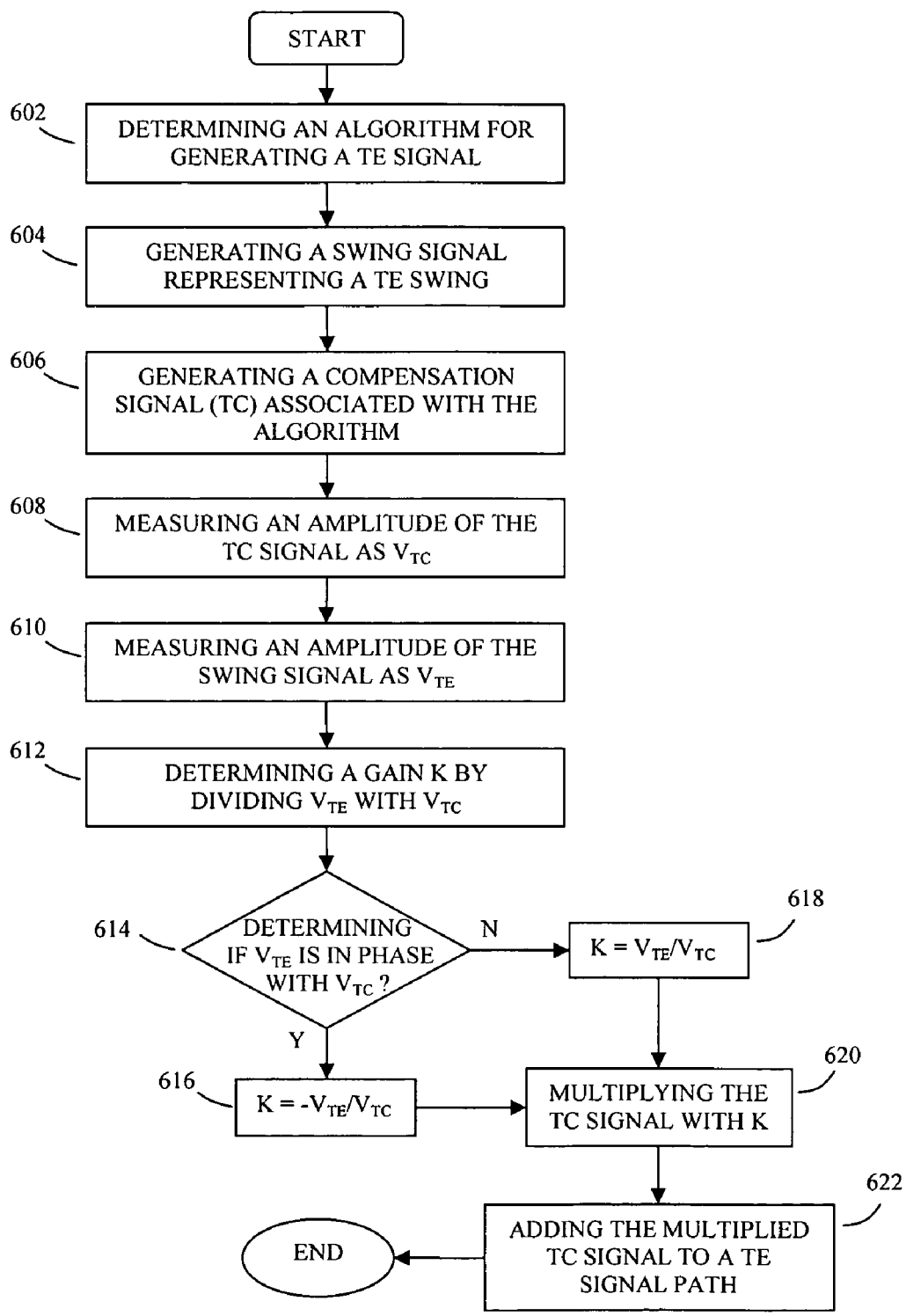
FIG. 6 is a flow diagram illustrating a method of compensating a TE swing in accordance with one embodiment of the present invention.

FIG. 6 is a flow diagram illustrating a method of compensating a TE swing in accordance with one embodiment of the present invention. The method can be used for the above-mentioned cases (a) to (g), and may be applicable to other algorithms for generating TE signals. Referring to FIG. 6, in step 602, the method determines an algorithm for generating a TE signal. The algorithm may include the DPD, 3-beam, push-pull or the combination thereof. Since a TE swing may result from a focus run-out (case (a)—first DPD), a tangential shift of a laser spot (case (b)—second DPD), a radial shift of a laser spot (case (c)—push-pull), or the combination thereof, determination of an algorithm for generating a TE signal helps understand the nature of a TE swing, and in turn helps generate a swing signal to represent the TE swing and a compensation signal to compensate the TE swing.

Next, in step 604, the method generates a swing signal that represents a TE swing associated with the algorithm determined in step 602. For instance, in case (a), a signal representing a TE swing is generated by biasing an FE signal. In step 606, a tracking error compensation (TC) signal associated with the algorithm is generated. The TC signal is K times in amplitude and reverse in polarity with respect to the signal representing a TE swing, K being a coefficient greater than zero. Steps 604 and 606 are interchangeable.

Next, in step 608, the method measures an amplitude of the TC signal as $V_{TC}$. In step 610, the method measures an amplitude, for example, a center shift amplitude, of the swing signal representing the TE swing as $V_{TE}$. Steps 608 and 610 are interchangeable. In step 612, the coefficient K is determined by dividing the amplitude $V_{TE}$ with the amplitude $V_{TC}$, i.e., $V_{TE}/V_{TC}$. Subsequent to step 612, in step 614, the method determines whether $V_{TE}$ is in phase with $V_{TC}$. In step 616, if $V_{TE}$ and $V_{TC}$ are in phase, K is equal to $-V_{TE}/V_{TC}$. If $V_{TE}$ and $V_{TC}$ are out of phase, in step 618, K is equal to $V_{TE}/V_{TC}$. The TC signal is then multiplied by K in step 620, and added to a TE signal path in step 622 to cancel the TE swing.

Figure 7:
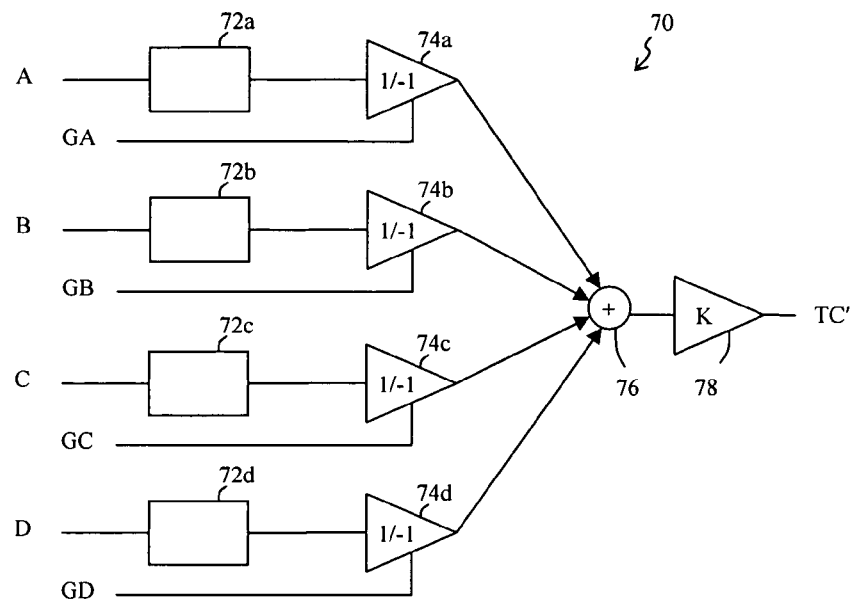
FIG. 7 is a block diagram of a circuit for generating a tracking error compensation signal in accordance with one embodiment of the present invention.

FIG. 7 is a block diagram of a circuit 70 for generating a tracking error compensation (TC) signal in accordance with one embodiment of the present invention. Referring to FIG. 7, circuit 70 includes a set of peak detection devices 72a, 72b, 72c and 72d, a set of unitary amplifiers 74a, 74b, 74c and 74d of a gain 1 or −1, a set of gain selection signals GA, GB, GC and GD, an adder 76, and an amplifier 78 of a gain K. Peak detection devices 72a, 72b, 72c and 72d, respectively coupled to a set of photo-detector elements A, B, C and D formed in a photo-detector, are provided to detect the amplitudes of the optical detection signals derived from the corresponding photo-detector elements A, B, C and D. Unitary amplifiers 74a, 74b, 74c and 74d are respectively coupled to peak detection devices 72a, 72b, 72c and 72d to provide an inverting or non-inverting gain selected by gain selection signals GA, GB, GC and GD. Adder 76 is coupled to unitary amplifiers 74a, 74b, 74c and 74d for adding their outputs. The added outputs are amplified with amplifier 78 of a gain K. The value of K is pre-determined by dividing a center shift amplitude of a signal that represents a tracking error (TE) signal swing with an amplitude of a pre-defined TC signal.

In operation, as an example of the above-mentioned case (a), i.e., the DPD method under the algorithm of phase (A+C)–phase (B+D), the TC signal is defined as peak (A+C)–peak (B+D). Referring again to FIG. 6, gain selection signals GA, GC and GB, GD respectively select gain of 1 and gain of −1 for amplifiers 74a, 74c and 74b, 74d. As a result of the processing of adder 76 and amplifier 78, the output TC' signal includes an equal amplitude and reverse polarity with respect to a TE signal swing. The TC' signal is then provided in a TE signal path to cancel a TE signal swing.

In one embodiment according to the invention, unitary amplifiers 74a, 74b, 74c and 74d of gain 1 or −1 are replaced by amplifiers of gain K or −K (not shown), and amplifier 78 of gain K is eliminated.

Skilled persons in the art would understand that circuit 70, in addition to the above-mentioned cases (a) to (g), is applicable to other TE generating methods once the value of K is determined for the methods.

Figure 8:
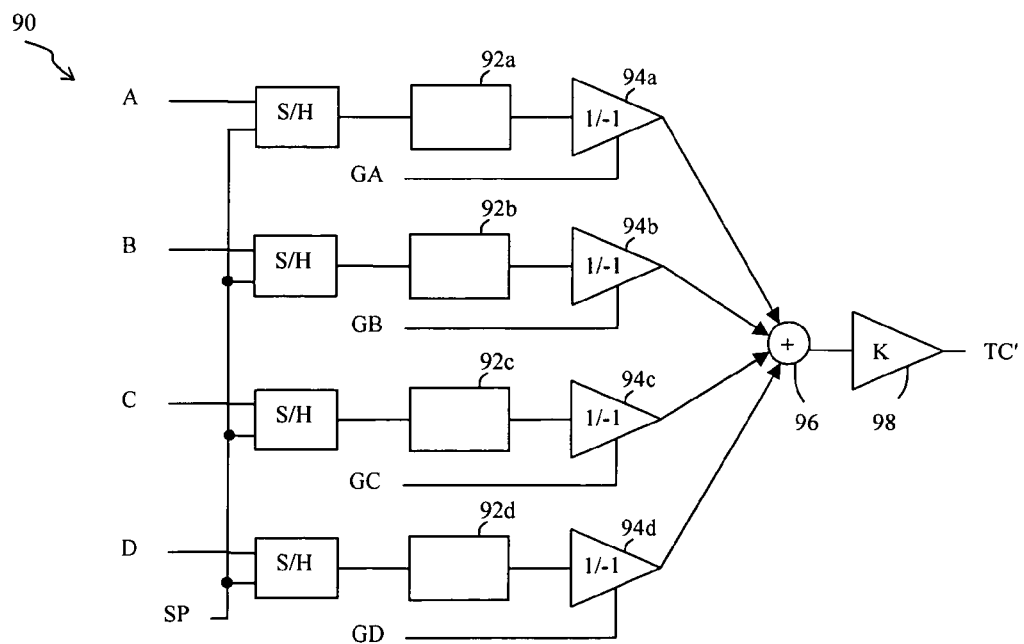
FIG. 8 is a block diagram of a circuit for generating a tracking error compensation signal in accordance with another embodiment of the present invention.

FIG. 8 is a block diagram of a circuit 90 for generating a tracking error compensation signal (TC) in accordance with another embodiment of the present invention. Referring to FIG. 8, circuit 90 includes a set of peak detection devices 92a, 92b, 92c and 92d, a set of unitary amplifiers 94a, 94b, 94c and 94d of a gain 1 or −1, a set of gain selection signals GA, GB, GC and GD, an adder 96, an amplifier 98 of a gain K, a set of sample-and-hold devices S/H, and a sampling pulse SP. Circuit 90 is similar to circuit 70 shown in FIG. 6 except the S/H devices and the SP signal, and may be used for the above-mentioned case (g) where a disc includes tracks under recording.

In operation, the S/H devices hold data in response to the sampling pulse SP. Specifically, each of the S/H devices stores an analog timing sample, i.e., an amplitude of an optical detection signal from photo-detector elements A, B, C or D, at a time point determined by the SP signal, i.e., a sample time. The amplitude sampled at the sample time is used to generate the TC' signal.

Figure 9:
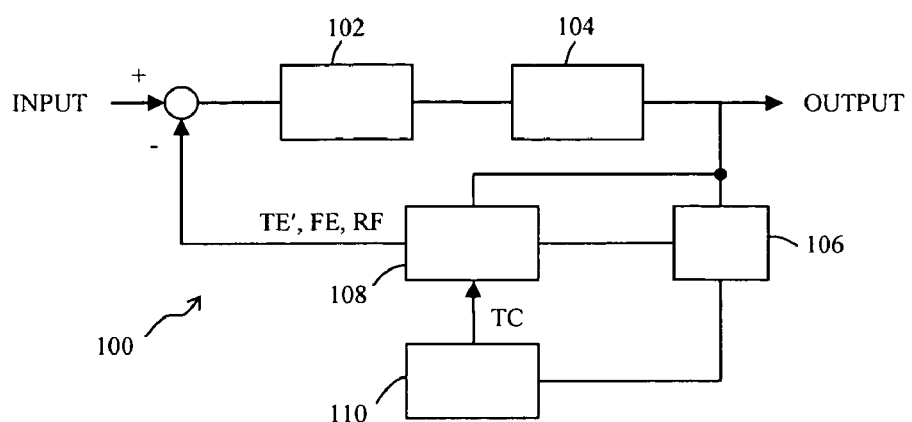
FIG. 9 is a block diagram of a servo control system in accordance with one embodiment of the present invention.

FIG. 9 is a block diagram of a servo control system 100 in accordance with one embodiment of the present invention. Referring to FIG. 9, servo control system 100 includes a controller 102, a plant sub-system 104, a photo-detector 106, an amplifier circuit 108, and a TC generating circuit 110. Controller 102 includes generally electronic components of servo control system 100, for example, processors, drivers, etc. Controller 102 processes servo control signals such as a tracking error (TE) signal and a focus error (FE) signal, and provides the functions such as focus servo control and tracking servo control. The focus servo control is provided to maintain a laser beam radiated on an optical disk at a predetermined convergence state. The tracking servo control is provided to keep a radiation position of a laser beam to follow a track formed on the optical disk.

Plant-subsystem 104 includes generally mechanical components of servo control system 100, for example, motors, actuators, etc. Photo-detector 106 may include four photo-detector elements A, B, C and D for detecting the position of a laser spot. Amplifier circuit 108 may include pre-amplifiers located at an optical pickup (OPU), and radio frequency (RF) amplifiers for generating RF signals including the TE and FE signals. The TE signal is one in which an amplitude is changed due to a deviation between a track position and the radiation position of a laser beam. The amplitude of the TE signal is at a zero level when the radiation position of the laser beam is located directly over the track. TC generating circuit 110 is provided to generate a TC signal for compensating a TE signal swing. Thus, the radiation position of the laser beam is controlled so that the amplitude of the TE signal becomes at the zero level. As a result, the radiation position of the laser beam follows the track. TC generating circuit 110 is similar to circuit 70 shown in FIG. 7, or circuit 90 shown in FIG. 8, and is not discussed herein.

Servo control system 100 further includes an input signal and an output signal. The input signal includes a target value to be entered to controller 102. For example, the input signal may be zero when servo control system 100 operates in a regulation mode. The output signal includes information regarding the OPU's height and position.

Figure 10A:
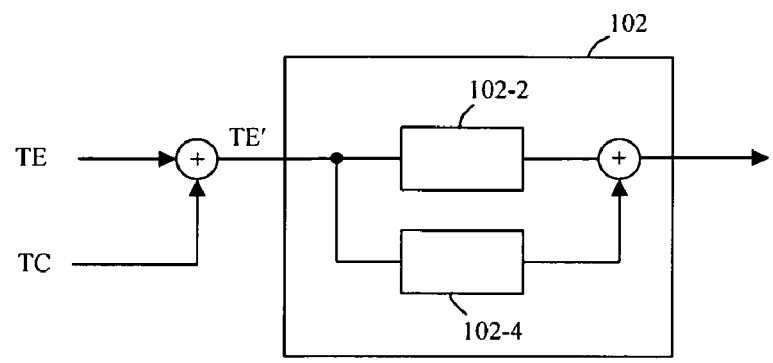
FIGS. 10A and 10B are schematic diagrams illustrating the path of a tracking error compensation signal in accordance with one embodiment of the present invention.

In the particular embodiment shown in FIG. 9, the TC signal is combined with the TE signal in amplifier circuit 108, resulting in a compensated tracking error signal TE'. Such a path of combination is shown in detail in FIG. 10A. Referring to FIG. 10A, the TE and TC signals are combined to become the TE' signal before they are input to controller 102. The TE' signal is then processed by a high-band part 102-2 and a low-band part 102-4 of controller 102.

Figure 10B:
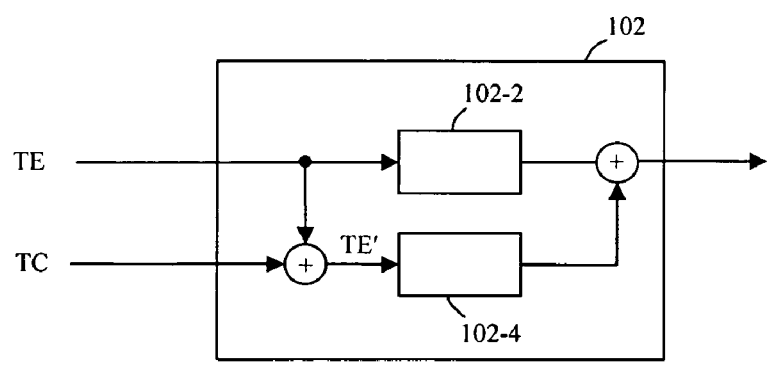

In one embodiment according to the invention, the TC and TE signals are combined in controller 102, as shown in FIG. 10B. Referring to FIG. 10B, the TC and TE signals are combined in controller 102. The combined signal TE' is sent to low-band part 102-4 of controller 102.

The TC signal is used to offset the TE swing in both the regulation mode and the search mode. The search mode may generally include a short-seek mode wherein an OPU jumps in a radial direction of a disc from a track to another one near the track, and a long-seek mode wherein an OPU jumps across a plurality of tracks. Servo control system 100 may run the risk of oscillation if system 100 abruptly switches from the regulation mode to the long-seek mode. In one embodiment according to the present invention, to avert the risk, the TC signal is held in controller 102 for a predetermined time prior to the long-seek mode. The predetermined time is sufficiently long to allow the OPU to reach a target track.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A circuit for generating a compensation signal (TC) to compensate a tracking error (TE) swing in a servo control system, the TC signal being pre-defined in accordance with an algorithm for generating a TE signal, the circuit comprising:

a set of peak detection devices corresponding to a set of photo-detector elements formed in a photo-detector, each of the peak detection devices detecting an amplitude of an optical detection signal derived from a corresponding photo-detector element;

a set of amplifiers of a same gain corresponding to the set of peak detection devices, the gain being selectable between an inverting and a non-inverting terminals;

a set of gain selection signals corresponding to the set of amplifiers to select one of the inverting and non-inverting terminals in accordance with the pre-defined TC signal; and an adder for adding the amplitudes that are gain selected.

2. The circuit of claim 1, the gain being determined by dividing a peak amplitude of a swing signal representing the TE swing with a peak amplitude of the pre-defined TC signal.

3. The circuit of claim 1, the amplifiers further comprising:

a set of unitary amplifiers of a gain selectable between 1 and −1, each of the unitary amplifiers being coupled between a corresponding peak detection device and the adder; and an amplifier of the same gain as each of the set of amplifiers coupled to the adder.

4. The circuit of claim 1 further comprising:

a set of sample-and-hold devices corresponding to the photo-detector elements; and a sampling pulse to activate the set of sample-and-hold devices at a sample time point.

5. The circuit of claim 1, the algorithm further comprising differential phase detection, push-pull and 3-beam.

6. The circuit of claim 1, the pre-defined TC signal further comprising a linear combination of peak (X) that represents an envelope peak amplitude value of an optical detection signal derived from a photo-detector element X of a photo-detector of the servo control system.

7. A servo control system comprising:

a photo-detector to detect a position of a laser spot;

a set of photo-detector elements formed in the photo-detector to provide optical detection signals regarding the position of the laser spot;

an amplifier circuit to generate a tracking error (TE) signal in accordance with an algorithm; and a circuit for generating a compensation signal (TC) to compensate a swing of the TE signal, the circuit further comprising:

a set of peak detection devices corresponding to the set of photo-detector elements, each of the peak detection devices detecting a peak amplitude of an optical detection signal derived from a corresponding photo-detector element;

a set of amplifiers of a same gain corresponding to the set of peak detection devices, the gain being selectable between an inverting and a non-inverting terminals;

a set of gain selection signals corresponding to the set of amplifiers to select one of the inverting and non-inverting terminals; and an adder for adding the amplitudes that are gain selected.

8. The system of claim 7, the TC signal being pre-defined in accordance with the algorithm.

9. The system of claim 8, the gain being determined by dividing a peak amplitude of a swing signal representing the TE swing with a peak amplitude of the pre-defined TC signal.

10. The system of claim 8, the pre-defined TC signal further comprising a linear combination of peak (X) representing an envelope peak amplitude value of an optical detection signal derived from a photo-detector element X of a photo-detector of the servo control system.

11. The system of claim 9, the swing signal representing the TE swing being associated with the algorithm.

12. The system of claim 7, the algorithm further comprising differential phase detection, push-pull and 3-beam.

13. The system of claim 7, the amplifiers further comprising:

a set of unitary amplifiers of a gain selectable between 1 and −1, each of the unitary amplifiers being coupled between a corresponding peak detection device and the adder; and an amplifier of the same gain as each of the set of amplifiers coupled to the adder.

14. The system of claim 7, the circuit for generating the TC signal further comprising:

a set of sample-and-hold devices corresponding to the photo-detector elements; and a sampling pulse to activate the set of sample-and-hold devices at a sample time point.

15. The system of claim 7 further comprising a controller including a low-band part and a high-band part.

16. The system of claim 15, the TC signal being combined with the TE signal in the amplifier circuit.

17. The system of claim 16, the TC signal and the TE signal combined in the controller being sent to the low-band part.

18. The system of claim 15, the TC signal being held in the controller for a predetermined time.

19. A servo control system comprising:

a photo-detector to detect a position of a laser spot;

a set of photo-detector elements formed in the photo-detector to provide optical detection signals regarding the position of the laser spot;

a tracking error (TE) signal generated in accordance with an algorithm;

a compensation signal (TC) associated with the algorithm to compensate a TE signal swing further comprising a linear combination of peak (X) representing an envelope peak amplitude value of an optical detection signal derived from one of the photo-detector elements X of the photo-detector; and a swing signal associated with the algorithm to represent the TE signal swing;

wherein a peak amplitude of the swing signal and a peak amplitude of the TC signal are measured in compensating the TE signal swing.

20. The system of claim 19, the peak amplitude of the swing signal being divided with the peak amplitude of the TC signal to determine a gain.

21. The system of claim 20, the TC signal being multiplied by the gain to compensate the TE signal swing.

22. The system of claim 19, the algorithm further comprising differential phase detection, push-pull and 3-beam.

23. A servo control system comprising:

a first circuit to generate a tracking error (TE) signal in accordance with an algorithm;

a TE swing produced in generating the TE signal in accordance with the algorithm;

a swing signal associated with the algorithm generated to represent the TE swing; and a second circuit to generate a compensation signal (TC) to compensate the TE swing, the TC signal being K times in amplitude and reverse in polarity with respect to the TE swing, K being a coefficient;

wherein the coefficient K is determined by dividing a peak amplitude of the swing signal with a peak amplitude of the TC signal.

24. A method of compensating a tracking error (TE) swing in a servo control system, comprising:

determining an algorithm for generating a TE signal;

generating a swing signal associated with the algorithm that represents the TE swing;

generating a compensation signal (TC) associated with the algorithm;

measuring an amplitude of the swing signal as $V_{TE}$;

measuring an amplitude of the TC signal as $V_{TC}$; and determining a gain by dividing $V_{TE}$ with $V_{TC}$.

25. The method of claim 24 further comprising:

determining whether $V_{TE}$ is in phase with $V_{TC}$;

determining the gain as $-V_{TE}/V_{TC}$ if $V_{TE}$ and $V_{TC}$ are in phase, or as $V_{TE}/V_{TC}$ if $V_{TE}$ and $V_{TC}$ are out of phase;

multiplying the TC signal with the determined gain; and adding the multiplied TC signal to a circuit for generating the TE signal.

26. The method of claim 24, the algorithm further comprising differential phase detection, push-pull and 3-beam.

27. The method of claim 24, the generating of a swing signal further comprising biasing a focus error signal to generate the swing signal.

28. The method of claim 24, the generating of a swing signal further comprising tilting a disc during rotation to generate the swing signal.

29. The method of claim 24, the generating of a swing signal further comprising applying a force to a tracking coil to generate the swing signal.

30. The method of claim 24, the generating of a TC signal further comprising generating the TC signal in a linear combination of peak (X) that represents an envelope peak amplitude value of an optical detection signal derived from a photo-detector element X of a photo-detector of the servo control system.

31. A method of compensating a tracking error (TE) swing in a servo control system, comprising:

providing an algorithm;

providing a first circuit to generate a tracking error (TE) signal in accordance with the algorithm;

generating a swing signal associated with the algorithm to represent a TE swing produced in generating the TE signal;

providing a second circuit to generate a compensation signal (TC) to compensate the TE swing, the TC signal being K times in amplitude with respect to the TE swing, K being a coefficient; and determining the coefficient K by dividing a peak amplitude of the swing signal with a peak amplitude of the TC signal.

32. The method of claim 31, the algorithm further comprising differential phase detection, push-pull and 3-beam.

33. The method of claim 31, the TC signal further comprising a linear combination of peak (X) that represents an envelope peak amplitude value of an optical detection signal derived from a photo-detector element X of a photo-detector of the servo control system.

34. A method of compensating a tracking error (TE) swing in a servo control system, comprising:

providing a photo-detector to detect a position of a laser spot;

providing a set of photo-detector elements formed in the photo-detector to provide optical detection signals regarding the position of the laser spot;

generating a tracking error (TE) signal in accordance with an algorithm;

generating a compensation signal (TC) associated with the algorithm in a linear combination of peak (X) that represents an envelope peak amplitude value of an optical detection signal derived from one of the photo-detector elements X of the photo-detector; and generating a swing signal associated with the algorithm to represent a TE swing produced in generating the TE signal.

35. The method of claim 34 further comprising:

measuring an amplitude of the swing signal as $V_{TE}$;

measuring an amplitude of the TC signal as $V_{TC}$; and determining a gain by dividing $V_{TE}$ with $V_{TC}$.

36. The method of claim 35 further comprising:

determining whether $V_{TE}$ is in phase with $V_{TC}$;

determining the gain as $-V_{TE}/V_{TC}$ if $V_{TE}$ and $V_{TC}$ are in phase, or as $V_{TE}/V_{TC}$ if $V_{TE}$ and $V_{TC}$ are out of phase;

multiplying the TC signal with the determined gain; and adding the multiplied TC signal to a circuit for generating the TE signal.

* * * * *